United States Patent [19]

Jahn et al.

[11] 4,204,976
[45] May 27, 1980

[54] GLASS FOR RADIO-PHOTOLUMINESCENCE DOSIMETRY

[75] Inventors: Walter Jahn, Ingelheim; Werner Schumann, Mainz, both of Fed. Rep. of Germany

[73] Assignee: JENAER Glaswerk Schott & Gen, Mainz, Fed. Rep. of Germany

[21] Appl. No.: 924,678

[22] Filed: Jul. 14, 1978

[30] Foreign Application Priority Data

Jul. 14, 1977 [DE] Fed. Rep. of Germany ....... 2731844

[51] Int. Cl.$^2$ .......................... C03C 3/16; C03C 3/30
[52] U.S. Cl. ............................ 252/301.4 P; 106/47 R
[58] Field of Search ............... 186/47 R; 252/301.4 P; 250/472, 361

[56] References Cited

U.S. PATENT DOCUMENTS

| | | | |
|---|---|---|---|
| 2,730,625 | 1/1956 | Shurcliff | 252/301.4 P |
| 3,020,238 | 2/1962 | Munakata et al. | 106/47 R |
| 3,449,136 | 6/1969 | Carpentier et al. | 106/47 R |
| 3,930,873 | 1/1976 | Kaes et al. | 252/301.4 P |

*Primary Examiner*—O. R. Vertiz
*Assistant Examiner*—Mark Bell
*Attorney, Agent, or Firm*—Haight & Huard

[57] ABSTRACT

Lithium-free silver-activated phosphate glass suitable for use in radio-photoluminescence dosimetry and having improved chemical resistance, particularly to weathering, is provided by controlling the alkali metal metaphosphate content in the glass compositions to not more than 26% by weight, preferably 15–26% by weight, and the alkaline earth metaphosphate content to at least 16% by weight, preferably 16–27% by weight, based on the total composition.

7 Claims, No Drawings

GLASS FOR RADIO-PHOTOLUMINESCENCE DOSIMETRY

BACKGROUND OF THE INVENTION

This invention relates to glass compositions suitable for use in radio-photoluminescence dosimetry and to improved radio-photoluminescent dosimeters characterized by containing said glass compositions as a source of latent fluorescent light radiation generated by exposure to gamma rays.

Glass dosimeters for measuring and recording ionizing radiation have been known for some 25 years. Those currently used are silver-bearing phosphate glass dosimeters which are similar to film dosimeters and are generally used for personnel dosimetry. These glass dosimeters, generally comprising two polished surfaces vertical to each other, are exposed to a ultra-violet light source after having been exposed to prior radiation, especially gamma radiation. The fluorescent radiation thus emitted is proportional to the gamma radiation which has been received, and is measured vertically to the direction of the UV-radiation incidence.

Dosimetry by means of silver phosphate glasses is based on the alternating effect of ionizing radiation at energy levels greater than about 10 keV on the silver ions in the glass. The nature of this alternating effect is still not completely clear, but the active centers formed by such radiation are believed to represent interference centers which, on energization with UV light at a frequency of about 365 nm, emit fluorescent light in the visible spectrum (the so-called radio-photoluminescence) which is then measured by means of a photoamplifier. The intensity of the emitted light is proportional to the gamma radiation dose received up to approximately $4 \times 10^3$ Rad. Such silver-activated metaphosphate glasses should desirably show a low natural fluorescence upon UV light stimulation as well as a high sensitivity to radiation, especially gamma radiation.

The relative dose sensitivity of such dosimeter glasses depends on the energy level of the gamma radiation to which they are exposed, and remains substantially constant from about 0.2 MeV up to about 10 MeV. Below about 0.2 MeV, the dose indication rises to a maximum at approximately 50 KeV. A reduction in the effective order of magnitude of the chemical elements in the glass can be used to reduce their energy dependence, which may require compensation by encapsulation with perforated metal filters.

The natural fluorescence of such compositions, which has been described as an "initial dose", comprises several components. The initial dose is partially dependent on the glass composition employed, the melting conditions used, the surface finish of the glass dosimeter and chemical changes which have taken place at the surface due to atmospheric influences. Superimposed over the radio-photoluminescence and measured as apparent gamma radiation, the initial dose is generally at least 100 mRad in the most favorable case and 700–800 mRad or more in unfavorable cases, with values in most cases falling between these two extremes. Manifestly, the smaller the initial dose of such a composition, the smaller are the actual doses which can be measured accurately. Using a sensitive measuring apparatus, individual doses of about 10–20 mRad can be measured, but such accuracy is unnecessary in all cases.

After exposure to radiation, the formation of luminescence centers continues and a maximum measured indicated value is not reached for from one to several days. This procedure, known in the art as "build-up", can be accelerated by use of increased temperature; for example, heat treatment at 100° C. allows final indicated values to be achieved after only 10–20 minutes. Under continued heat treatment at 100° C. for longer than one hour, a slight decrease in radio-photoluminescence is noted.

The silver metaphosphate content of the glass has an an important effect on the build-up performance; in general, an increasing $AgPO_3$ content accelerates the build-up, while a decreasing content retards build-up. However, a lower $AgPO_3$ content may be required to reduce the effective order of magnitude, so that heat treatment before dosimeter assessment may become necessary in any case.

Silver-bearing phosphate glass dosimeters have relatively small dimensions due to their good sensitivity; for example, rod dosimeters are typically 0.1 mm$\times$6 mm and plates or oblongs typically 10$\times$10$\times$1.5 mm. or 8$\times$8$\times$4.7 mm., respectively.

The dosimeter glasses generally contain large proportions of $LiPO_3$. The lithium proportion ensures a low effective order of magnitude while at the same time giving a low natural luminescence or initial dose to the dosimeter. However, in view of its alternating effect with thermal neutrons, such lithium-containing dosimeter glass is inherently sensitive to thermal neutrons, reacting according to the nuclear process $^6Li(n,\alpha)^3H$. The secondary ionization caused by the resulting alpha-radiation releases the radio-photoluminescence. Thus, in the case of radiation containing gamma-radiation as well as thermal neutrons, both components are indicated as the sum of ionization.

Phosphate glasses for dosimeters with a relatively low effective order of magnitude have been described by R. Yokota et al. in Health Physics 5: 219–224 (1961), the contents of which are incorporated by reference herein. These glasses contain about 50 parts by weight $LiPO_3$ and $Al(PO_3)_3$ and are melted with the addition of approximately 2–8 parts by weight $AgPO_3$ as an activator. These glasses are sensitive to gamma radiation and, owing to their lithium content, to thermal neutrons as well.

In most applications, it is desirable to exclude thermal neutron sensitivity so that the glasses used in such dosimeters must not contain lithium. Sodium and, in principle, potassium are available as substitutes for the alkali metal lithium in such glasses. Lithium-free silver-bearing phosphate glass dosimeters having sodium as the alkali metal component are known, e.g. see Health Physics 20: 662–663 (1971), the contents of which are incorporated by reference herein. The two dosimeter glass compositions disclosed therein contain 8.93 and 11.00 parts by weight of sodium, corresponding respectively to about 39.64 and 48.7 parts by weight of $NaPO_3$, with the remainder of the compositions comprising aluminum and silver metaphosphate. However, sodium is not an entirely satisfactory substitute due the relatively high order of magnitude in such glasses, which contain the isotope $^{40}K$ having a natural radioactivity which contributes, albeit to a limited extent, to background radio-photoluminesence.

As a result of their high alkali metal metaphosphate content, prior art silver-bearing phosphate glass dosimeters have only a limited chemical resistance and a generally poor resistance to atmospheric effects, tending to surface flaking after atmospheric exposure for a month or two and occasionally building up opaque layers at a later stage. Furthermore, in most cases the polished glass surface becomes sticky after such extended storage. While such initial surface changes can be eliminated by washing with distilled water without greatly affecting the initial dose, more marked effects result in irreversible damage, so that the practical application of such dosimeter glasses is limited.

In dosimeter glasses having a relatively low effective order of magnitude, relatively low initial doses (less than about 1 Rad) and high sensitivity, it has heretofore been assumed that a high alkaline metaphosphate content, e.g. of 30–50% by weight, is required. However, as previously noted, such high alkaline metaphosphate contents result in poor resistance to atmospheric weathering. In principle, it is possible to improve the surface chemical resistance by the addition of beryllium oxide or beryllium phosphate, as the low position of beryllium in the periodic table of the elements is an advantage in favoring low energy dependence. However, this is not a desirable alternative in view of the extensive safety measures required during melting and processing to avoid potential danger to workers and the enviornment casused by the extreme toxicity of beryllium compounds.

Alternatively, the use of magnesium oxide or magnesium metaphosphate can be used to improve the surface chemical resistance, e.g. a sodium aluminum phosphate glass containing magnesium phosphate as a silver-activated dosimeter glass is described in Toshiba's Catalog No. 4211, "Fluoro-Glass Dosimeter" containing 29.27% $NaPO_3$; 14.63% $Mg(PO_3)_2$; 53.66% $Al(PO_3)_3$; and 2.44% $AgPO_3$. However, the sensitivity of this glass is somewhat less than that of a comparable magnesium-free dosimeter glass and the initial dose increases as the result of the changed chemical composition. Furthermore, this glass does not withstand long storage periods, particularly at high temperatures in humid atmospheres.

OBJECTS OF THE INVENTION

Accordingly, it is a general object of the present invention to provide lithium-free, silver-activated phosphate glass having improved chemical resistance for use in radio-photoluminescence dosimetry.

Another object of the present invention is to provide such glasses which have a low natural fluorescence and a high sensitivity to gamma radiation.

A further object of the present invention is to provide such glasses which are substantially insensitive to thermal neutrons.

An additional object of the present invention is to provide such glasses which exhibit good resistance to atmospheric weathering, particularly to surface flecking and development of sticky surfaces during protracted storage.

A more particular object of the present invention is to provide such glasses which are substantially free of toxic beryllium compounds.

Upon study of the specification and appended claims, further objects, features and advantages of the present invention will become more fully apparent to those skilled in the art to which this invention pertains.

SUMMARY OF THE INVENTION

Briefly, the above and other objects, features and advantages of the present invention are attained in one aspect thereof by providing a lithium-free silver-activated phosphate glass suitable for radio-photoluminesence dosimetry, consisting essentially of, in percent by weight based on the total composition:
  not more than 26% by weight of alkali metal phosphates; at least 16% by weight alkaline earth metaphosphate; a radio-phospholuminescent activating amount of silver metaphosphate; and
  balance, aluminum metaphosphate.

DETAILED DESCRIPTION

In one aspect of the present invention, it has surprisingly been found that improved glass compositions for radio-photoluminesence dosimetry are obtained when the alkali metal content of such glasses is not only considerably lowered but consists essentially of only sodium metaphosphate and simultaneously the magnesium phosphate content of such glasses is greatly increased. This combination leads to glasses having desirable chemical resistance to atmospheric weathering effects. In combination with little or no decrease in sensitivity, such glasses surprisingly do not exhibit the expected undesirable increase in initial dose. Furthermore, the sensitivity remains substantially constant while the initial dose value is improved by better than 50%, e.g. from about 600 mRad to about 265 mRad, considerably increasing the measuring accuracy in the lower measuring range of dosimeters using such glass.

In order to obtain comparable initial dose values, all values reported herein are for the initial dose of newly melted and similarly aligned glasses, so that the influences of surface changes due to long exposure to the atmosphere as well as that of naturally occurring background radiation are eliminated. The above comparisons are illustrative for glasses having the same $AgPO_3$ content (3.50% by weight). The initial dose and sensitivity both change with differences in silver content, with lower silver contents resulting in a smaller initial dose and correspondingly increased sensitivity. Furthermore, the kinetics of dose build-up on completion of radiation exposure are considerably reduced.

The dosimeter glass compositions of the present invention are characterized in having an alkali metal metaphosphate content of not greater than 26% by weight, preferably 15–26% by weight and especially about 19–24% by weight, and an alkaline earth metal metaphosphate content of at least 16% by weight, preferably 16–27% by weight and especially about 20–24% by weight. The preferred alkali metal metaphosphate is $NaPO_3$, while the preferred alkaline earth metaphosphate is $Mg(PO_3)_2$. The remainder of the glass composition preferably consists essentially of $Al(PO_3)_3$ and an activating amount of a suitable radio-photoluminescent activating compound, e.g. about 2–8% by weight, preferably about 3–4% by weight, $AgPO_3$.

As the glass compositions of the present invention are preferably melted exclusively from metaphosphates, they can be considered as metaphosphate glasses in their final composition so that it is useful to give the components of the composition as metaphosphates, rather than converting the formula to their oxides. While the melting of the corresponding oxides is possible in principle, the glasses obtained are frequently unusable due to yellow staining or brown coloration and the lack of transparency suitable for radio-photoluminesence.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. All temperatures are set forth uncorrected in degrees Celsius; unless otherwise indicated, all pressures are ambient and all parts and percentages are by weight.

EXAMPLE 1

1000 grams of the following composition:
about 23.9% $NaPO_3$;
about 24.4% $Mg(PO_3)_2$;
about 48.2% $Al(PO_3)_3$; and
about 3.5% $AgPO_3$ is melted in a ceramic crucible over a period of approximately two hours at 1250° C. The temperature is then raised to 1450° C., and refining continued for 65 minutes to remove the bubbles. After standing at a reducing temperature, the glass is cast into iron moulds at 1000° C. and cooled slowly (from Tg at approximately 6° C. per hour). Glass samples treated for 50 days in a conditioning cabinet at 50° C. and 100% relative humidity showed only limited flecking.

EXAMPLE 2

Following the procedure of Example 1, the following composition was employed with similar results:
about 19.1% $NaPO_3$;
about 19.5% $Mg(PO_3)_2$;
about 57.9% $Al(PO_3)_3$; and
about 3.5% by weight $AgPO_3$.

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

What is claimed is:

1. A lithium-free silver-activated phosphate glass having a transparency suitable for radio-photoluminesence dosimetry, consisting essentially of, in percent by weight based on the total composition:
    15-26% by weight of $NaPO_3$;
    16-27% by weight $Mg(PO_3)_2$;
    a radio-phospholuminescent activating amount of silver metaphosphate; and
    balance, aluminum metaphosphate.

2. A composition according to claim 1, containing 2-8% silver metaphosphate.

3. A composition according to claim 1, consisting essentially of:
    about 19.1% $NaPO_3$;
    about 19.5% $Mg(PO_3)_2$;
    about 57.9% $Al(PO_3)_3$; and
    about 3.5% $AgPO_3$.

4. A composition according to claim 1, consisting essentially of:
    about 23.9% $NaPO_3$;
    about 24.4% $Mg(PO_3)_2$;
    about 48.2% by weight $Al(PO_3)_3$; and
    about 3.5% by weight $AgPO_3$.

5. In a radio-photoluminescence glass dosimeter for measuring exposure to gamma radiation, the improvement wherein the glass dosimeter consists essentially of the composition according to claim 1.

6. A lithium-free silver-activated phosphate glass having a transparency suitable for radio-photoluminescence dosimetry, consisting essentially of, in percent by weight based on the total composition:
    19-24% of alkali metal metaphosphate;
    20-24% alkaline earth metal metaphosphate;
    3-4% silver metaphosphate; and
    balance, aluminum metaphosphate.

7. In a radio-phospholuminescence glass dosimeter for measuring exposure to gamma radiation, the improvement wherein the glass dosimeter consists essentially of the composition according to claim 6.

* * * * *